INVENTOR.
SOL SHAPIRO

Fig. 8. ANGULAR POSITION OF PHASING SECTOR 98

United States Patent Office 3,106,642
Patented Oct. 8, 1963

3,106,642
INFRARED SEARCH AND TRACKING SYSTEM COMPRISING A PLURALITY OF DETECTORS
Sol Shapiro, Maywood, N.J., assignor to ACF Industries, Incorporated, New York, N.Y., a corporation of New Jersey
Filed Jan. 29, 1959, Ser. No. 789,854
17 Claims. (Cl. 250—83.3)

This invention is directed to an electronic search and tracking system for moving objects. Particularly, the invention is in a novel system utilizing infra-red detection for the passive search and tracking of targets.

Unlike radio or radar, infra-red energy is not picked up, amplified, and then demodulated into audio or video signals. Infra-red radiation is broadband and of a very random nature. It closely resembles noise. Being non-coherent, it cannot be heterodyned as can radio and radar R.-F. signals. Instead, infra-red energy is picked up by an optical system that focuses the energy on a detector. Depending on its characteristics, the detector responds to changes in the infra-red energy falling on it by changes in resistance or potential.

It is, therefore, an object of this invention to utilize an infra-red energy detector for searching and tracking moving objects.

It is another object of this invention to provide a system utilizing an infra-red detector device to provide tracking and searching signals.

It is another object of this invention to replace mechanical tracking by a system utilizing the frequency and phasing of an electrical signal initiated by infra-red detection of a target to provide tracking information.

The multiple frequency search and automatic track system of the invention is divided into two major functions: search and track. In the search system, a multiple frequency reticle divides a field of view into several zones. Separate infra-red sensitive cells are located in these zones and low level storage circuits are used. Only one amplifier is required to raise the signal level of the sum of the several storage circuit signals. Parallel filter channels then separate the previously summed signals, which are then detected and commutated for presentation. The parallel filter channels can also be display reeds for direct viewing.

Automatic tracking is provided to determine the cell on which a target is imaged. The signal amplifier output is modulated with a reactance tube oscillator. The modulator output is then passed through a bandpass filter, the output of which drives a discriminator. The discriminator output signal is used to drive the reactance tube oscillator and thereby track the target. Polar information is obtained by means of a phasing sector.

Figures 1, 1A:
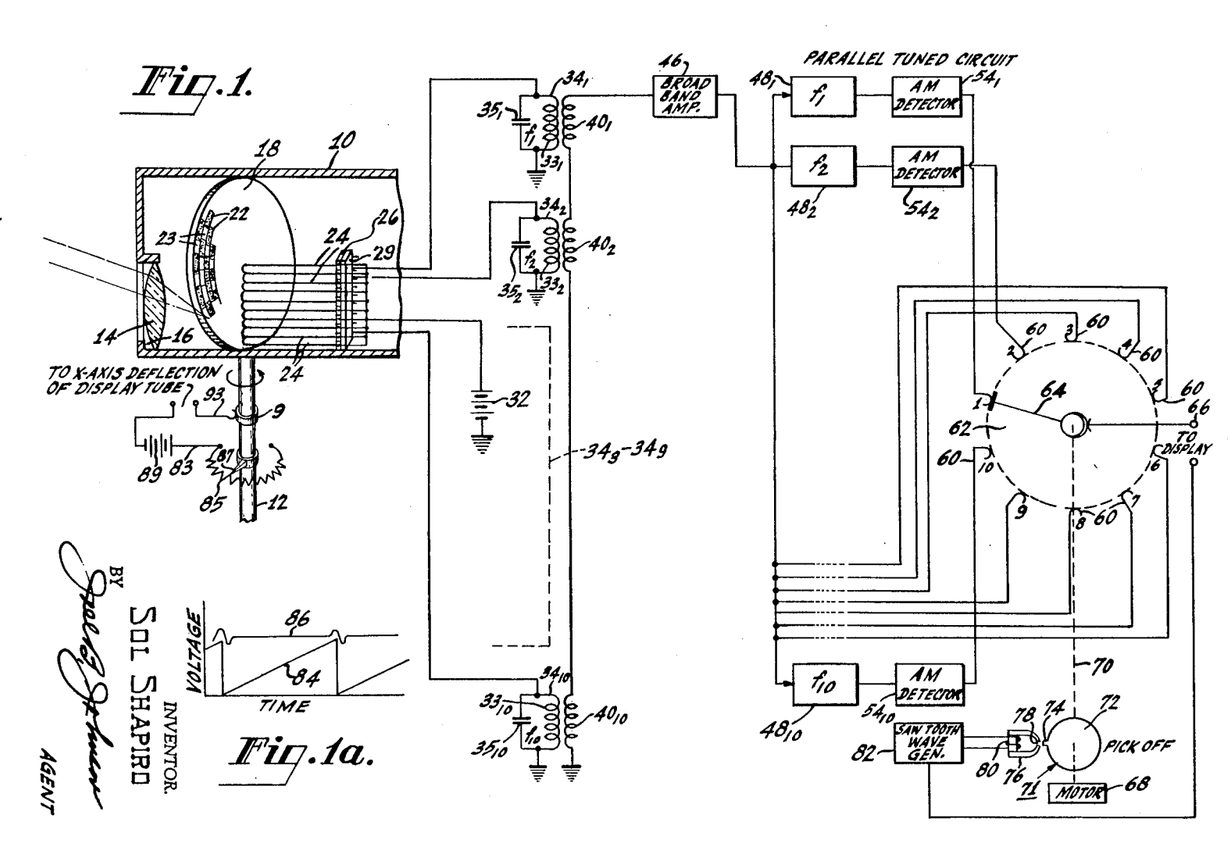
FIG. 1 is a schematic representation and block diagram of a novel search system in accordance with the invention.
FIG. 1a is a graphical representation of the wave form of the saw tooth generator of FIG. 1.
Figure 2:
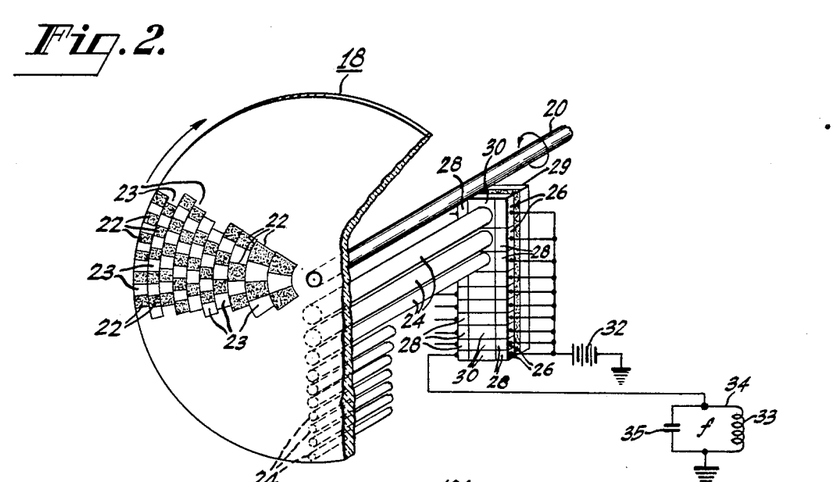
FIG. 2 shows the novel infra-red detecting device used in the system of FIG. 1.

The search system disclosed in FIGS. 1 and 2 includes an infra-red detecting device consisting of a housing 10 supported by a vertically mounted shaft 12, which is supported in any manner for rotation about the vertical axis of shaft 12. Housing 10 is a completely closed box having a single opening 14, within which is mounted an appropriate optical system 16 for projecting the image of an exterior object onto the surface of a reticle disc 18. The reticle disc 18 is mounted within the housing 10 on a horizontal shaft 20 (FIG. 2) for rotation about a horizontal axis. The reticle and its shaft may be driven by any appropriate power means, such as an electric motor, to rotate the reticle about its center.

As shown in greater detail in FIG. 2, the reticle 18 consists of a flat circular disc having spaced areas 22 opaque to infra-red radiation and arranged in ten concentric light chopping rings. The opaque areas 22 are spaced in each ring by equal areas 23 transparent to infra-red radiation to form alternating transmitting and opaque chopping portions. The arrangement is such that the number of transmitting areas 23 on all the rings bear the relationship 10 to 11 to 12 to 13, etc., with the transmitting areas of the innermost ring being of the least number. The reticle speed during the operation of the device is selected so that 1000 transparent areas 23 of the innermost ring will pass a given point per second providing a chopping frequency $f_1$ for this ring. At this speed, the transparent areas of the second innermost ring will pass a given point at the rate of 1100 areas per second giving a chopping frequency $f_2$, the next outer ring at 1200 transparent areas per second giving a chopping frequency $f_3$. Thus the ten rings on reticle 18 provide frequencies $f_1, f_2, f_3 \ldots f_{10}$ having values respectively of from 1000 per second to 1900 per second.

Mounted behind the reticle disc 18 is a bank of ten light-transmitting rods 24. As disclosed in both FIGS. 1 and 2, the rods 24 are mounted parallel to each other and in a vertical stack, one above the other. Each rod is positioned so that a different one of the concentric rings of the reticle 18 is caused to sweep continuously over the adjacent end of the rod. Closely spaced from, if not contacting, the opposite end of each light transmitting rod 24 is a different single infra-red sensitive cell 26. The cells 26 are also arranged in a vertical bank, with only one of the cells aligned with each light transmitting rod 24. The transmitting rods 24 may be of any appropriate material such as quartz.

The infra-red cells 26 are of any well-known type and may be either photoconductive or photovoltaic. The cells 26 are formed as spaced layers and insulatingly supported on a dielectric member 29. Each cell consists of a pair of electrode coatings 28 (FIGURE 2) spaced from each other by a deposit 30 of a small amount of infra-red photosensitive material, such as photoconductive lead sulfide or lead telluride. Each cell has one electrode coating 28 connected to a D.C. source of energy such as a battery 32 and the other electrode coating 28, thereof, to a different tuned circuit impedance 34. To simplify illustration, FIGURE 2 discloses only a single tuned resonant circuit 34, connected to one of the cells 26. It is to be understood that each of the cells, shown in FIGURE 2, is connected to a similar circuit. Each tuned resonant circuit 34, connected to each cell, consists of an inductance 33 and a capacitance 35 selected to approximately match the impedance of the respective cell.

As indicated in FIGURE 1, the ten cells 26 are connected in the manner shown in FIGURE 2, to a different resonant circuit $34_1$, $34_2$, ... $34_{10}$, respectively. Each resonant circuit is tuned respectively to the one frequency $f_1$, $f_2$, ... $f_{10}$ corresponding to the reticle chopping frequency provided by the transparent areas of the chopping ring to which the cell 26 is optically coupled by one of the light conducting rods 24. For example, in FIG. 1 the topmost cell 26 is disclosed as being optically coupled by a rod 24 with the innermost ring of reticle 18. Thus, the resonant circuit $34_1$, connected to this cell is tuned to the frequency $f_1$ of 1000 cycles per second, the chopping frequency of the innermost ring, as set forth above.

In FIG. 1, three tuned storage circuits, $34_1$, $34_2$, and $34_{10}$, are shown as representative of the ten tuned circuits each connected respectively to a different one of the ten cells 26.

The inductive elements $33_1$, $33_2$, ... $33_{10}$ of the ten resonant circuits $34_1$, $34_2$, ... $34_{10}$ are each coupled to a different secondary winding $40_1$, $40_2$, ... $40_{10}$, respectively. The ten secondary windings $40_1$, $40_2$, ... $40_{10}$ are connected in series to a broadband amplifier 46. The impedance of each tuned circuit, $34_1$, $34_2$, ... $34_{10}$, is approximately one megohm to permit the addition of ten channels without providing an excessive impedance level on the secondary windings. A stepdown transformer turns ratio of approximately 4 to 1 is used. The signal of the ten secondary windings is applied to the input of amplifier 46, which has a one megohm input impedance and has sufficient bandwidth to pass all relevant frequencies $f_1$, $f_2$, ... $f_{10}$. For the ten channels used in the system of FIG. 1, and which are spaced by 100 c.p.s. from 1000 c.p.s. up, a bandwidth from 900 c.p.s. to 2000 c.p.s. is adequate.

The output from amplifier 46 is used to drive ten parallel tuned storage circuits $48_1$, $48_2$, ... $48_{10}$, of which only three circuits are indicated in FIG. 1. These tuned storage circuits consist of an inductance and a capacitance in parallel similar to circuits $34_1$, $34_2$, ... $34_{10}$ and are identical in frequency response to the input circuits $34_1$, $34_2$, ... $34_{10}$, respectively, but are matched in impedance to the amplifier output. Other filtering devices may be used in place of the tuned circuits $48_1$, $48_2$, ... $48_{10}$ such as magnetostriction filters.

The output of the filter circuits $48_1$, $48_2$, ... $48_{10}$ is amplitude detected by being connected in turn to a different A.M. detector $54_1$, $54_2$, ... $54_{10}$, respectively. The output from the several A.M. detectors is commutated by connecting each detector to a different stationary terminal 60 of a commutating device 62. The rotating commutator arm 64 will sequentially connect each terminal 60 to a terminal connector 66. Device 62 is schematically shown as a mechanical commutator. However, it is recognized that other commutating devices, such as electron beam switching or gating devices, may be used. The values of the storage circuits $48_1$, $48_2$, ... $48_{10}$ are chosen to provide a time constant such that the signal fed to each storage circuit is stored for a longer time than one revolution of the commutator arm 64. Thus, the target can be followed as its image passes from cell 26 to an adjacent cell 26.

The rotating commutator arm 64 is driven by a motor 68 through a shaft 70 connected directly to arm 64. Also mounted on shaft 70 for direct rotation therewith is a pickoff device 71 consisting of a metallic disc 72 having, on its periphery, a projection 74. Closely spaced from disc 72 is a magnet armature 76 having two portions separated by a small space 78, which is closely positioned adjacent to the rotational path of the projection 74. The pickoff device 71 is representative of other well-kown devices, which may be used at this point.

A coil 80 wound around the magnet armature 76 generates current pulses which are fed to any appropriate saw tooth generator 82. Such a saw tooth wave generator may be a circuit including a gas triode or thyratron tube (not shown), to the plate circuit of which is applied a biasing voltage. The cathode-plate circuit of the tube, consisting of a resistance and a capacitance in series, permits the voltage across the tube to rise exponentially, as shown in the curve 84 in FIG. 1a. The wave form generated by the pickoff 71 and fed to the saw tooth wave generator 82 may be represented by the curve 86 of FIG. 1a. When oscillations having the wave form 86 are applied to the grid of the thyratron, the tube will discharge as the voltage across the tube reaches ionizing potential determined by the applied wave 86. The values of the resistance and capacitance in the thyratron circuit are adjusted so that the time constant provides that the frequency of the saw tooth oscillation 84 takes on a value that is in exact harmonic relationship with the applied pickoff frequency 86. Thus the values of the saw tooth wave generator circuit 82 are adjusted so that one rotation of the commutator arm 64 takes place in the time of single saw tooth oscillation of wave 84.

The resulting saw tooth signal 84 may be applied to an oscillograph tube to provide movement of the beam in the y-direction. The x-direction of the beam of the oscillograph tube is determined in any appropriate manner from the azimuth rotation of the infra-red detector housing 10 about its support 12. For example, voltage may be fed to the x-deflection plates of the cathode ray oscillograph tube from a circuit 83 (FIG. 1) having a variable resistor 85 whose adjustable control is connected to the shaft of housing 10 to be turned therewith. A source of voltage 89 is in circuit 83, which also includes part of shaft 12, a contact ring 9 and a brush contact 93.

The signal pulses passing through the commutator arm 64 to terminal 66 are fed to the control grid of the oscillograph tube. In this manner, the presentation on the oscillograph tube will provide a visual representation of the elevational position of a moving target. It is well recognized that other types of displays, as well as information storing systems, may be used in place of the oscillograph tube. For example, the derived information may be fed to computer mechanisms to provide the information in other forms.

Figures 3, 3A:
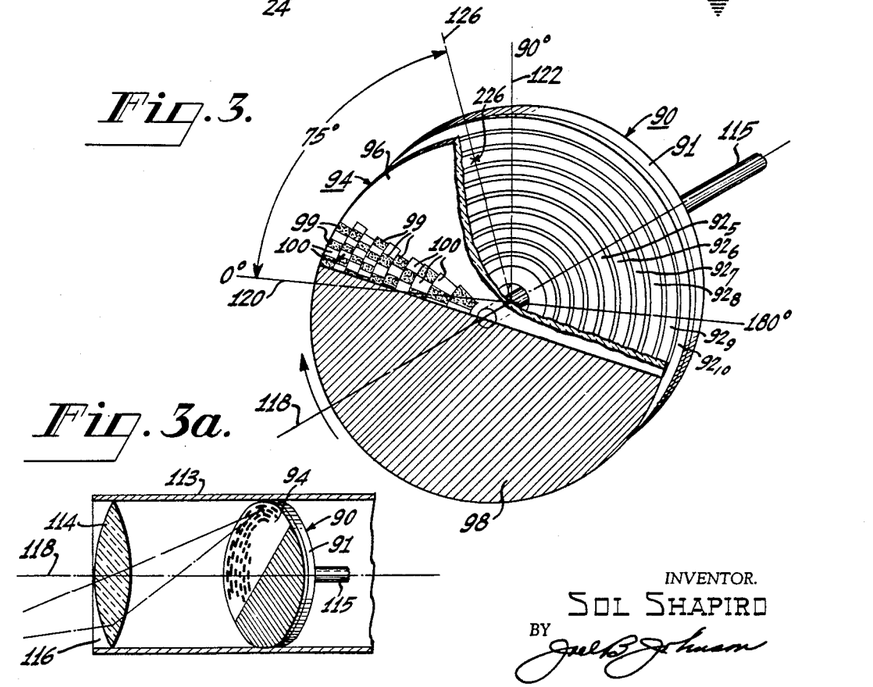
FIG. 3 is a showing of a part of the infra-red detecting structure used in a tracking and search system in accordance with the invention.
FIG. 3a discloses a portion of the detector head used in the system of FIG. 3.

FIGS. 3, 4, 4a, 5 and 6 disclose another form of applicant's invention, in which an infra-red detector is used for tracking a moving object. The device has application for tracking aerial targets. FIG. 3 shows an infra-red detector consisting of an infra-red cell assembly 90, consisting of a support plate 91, on one surface of which there are formed ten infra-red cells 92 in the configuration of concentric rings about the center of the circular support plate 91. Mounted closely adjacent to exposed surfaces of the infra-red cells 92 is a chopping disc 94, which is made of an infra-red transparent material such as quartz or sapphire. The chopping disc 94 comprises a chopping sector 96, forming one half of the disc 94 and a phasing sector 98, forming the other half of the disc 94. The chopping sector 96 consists of ten concentric rings corresponding to the infra-red ring 92. Each ring of the chopping sector 96 is formed of alternate infra-red opaque areas 99 and infra-red transparent areas 100 arranged in a manner similar to that of reticle 18. The opaque and transparent portions are of equal area in each ring, while the ten rings themselves each are of the same area. All of the phasing sector 98 is opaque to infra-red.

The chopping disc 94, as well as the reticle disc 18 of the modification of FIG. 1, may be formed in any appropriate manner such as, for example, by photographic techniques. Such a technique is one in which one surface of the quartz or sapphire disc is coated with a metal film, such as copper or silver, which is opaque to infra-red radiations. The coating can be put down by plating, spraying or sputtering of the metal onto the disc surface. The metal layer is next coated with a photosensitive resist material which, when dry, is exposed to light through a stencil or mask having the desired configuration. After exposure, the unexposed portions of the photoresist are washed away to expose the metal underneath. The exposed metal is now removed by etching or sand blasting to expose the surface of the transparent disc.

Figure 4:
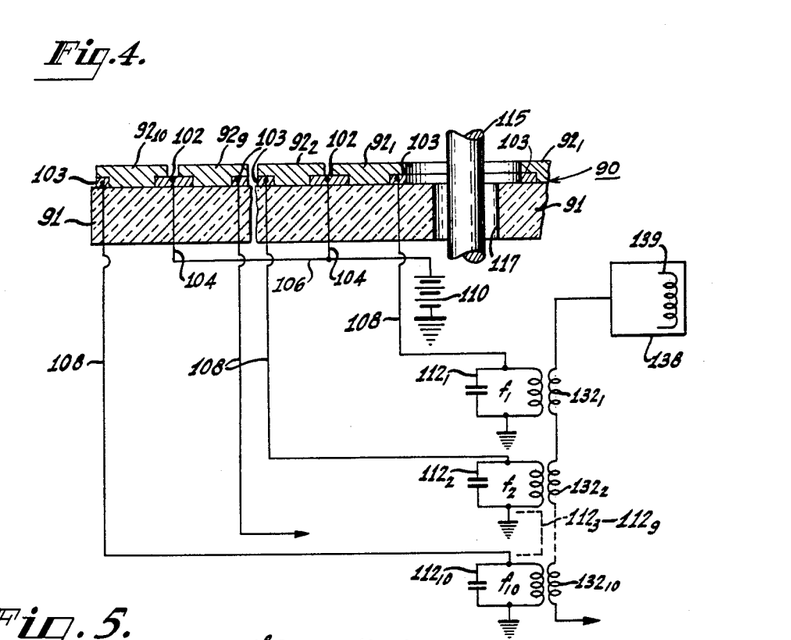
FIG. 4 is a schematic representation partially in section of the structure and circuit of a portion of the novel tracking and search system.

FIG. 4 schematically shows a partial sectional view of the structure of the cell assembly 90. The infra-red cells, as shown, consist of concentric deposits $92_1$, $92_2$, ... $92_{10}$ of infra-red sensitive photoconductive material such as any one of the lead or cadmium sulfides or selenides or tellurides. Each one of the concentric deposits $92_1$, $92_2$, ... $92_{10}$ of photoconductive material is formed in contact with one electrode ring 102 and one electrode ring 103 formed of metallic or electrically conductive material. The electrode rings are also formed concentric with the center of support plate 91 and each electrode ring 102 bridges the space between adjacent ones of every two concentric photoconductive cells 92. Rings 103 are positioned as spaced pairs of rings adjacent to each other. Each ring 103 is in contact with the edge of a different photoconductive ring 92 opposite to the edge of the ring 92 in contact with a conductive ring 102. Conductive leads 104 are connected to each one of the concentric electrode rings 102 and are brought out through the support plate 91 and connected to conductor 106 which in turn is tied to the positive terminal of a direct current source of voltage 110. Each ring 103 is connected to the grounded negative terminal of voltage source 110 through a lead 108 and one of several tuned storage circuits $112_1$, $112_2$, ... $112_{10}$, respectively. This circuit arrangement provides a potential difference between each of the concentric electrode rings 102 and one of the electrode rings 103 and thus across each of the concentric photoconductive rings 92.

The chopping disc 94 is mounted for rotation about its axis, so that each point of the photoconductive rings 92 is scanned alternately by the chopping sector 96 and the phasing sector 98. As schematically represented in FIG. 3a, the infra-red detector device, consisting of the concentric photoconductive ring assembly 90 and the chopping disc 94, is mounted within an infra-red and light opaque housing 113. Chopping disc 94 is mounted on a shaft 115 for rotation about a horizontal axis 118 normal to disc 94. Shaft 115 may pass through an open center portion 117 of the fixed assembly 90 (FIGURE 4). An optical lens system 114 is mounted within an opening 116 of housing 113 to provide means for optically focusing images of distant objects onto the rotating chopping disc 94. Axis 118 may be a common axis of the optical system 114, the chopping disc 94 and the cell support plate 91 and may be used as a reference for directing the detector system toward the spatial region in which moving targets are to be tracked.

During tracking, the housing 113 is maintained stationary. A secondary reference line 120 (FIG. 3) is arbitrarily selected on the surface of cell support plate 91, such that it is perpendicular to the axial reference line 118. A third reference line 122 is selected perpendicular to both reference lines 118 and 120 and also lying on the surface of the cell support plate 91. Reference lines 120 and 122 divide the area of the support plate 91 into four equal quadrants. Infra-red radiations from a target will be received by the lens system 114 and focused through the chopping reticle disc 94 to form an image of the target in any of the four quadrants of cell support plate 91. This infra-red image from the target will fall onto one of the concentric photoconductive rings 92 and will be modulated by the chopping action of the opaque areas of the rotating disc 94.

The chopping sector 96 of the reticle disc 94 is designed with the opaque and transparent portions having a similar arrangement as those described for reticle 18 of FIG. 2. That is, the ratio of the number of opaque areas on the ten successive rings starting with the innermost ring is 10 to 11 to 12, etc. Again, the reticle speed may be selected to yield chopping frequencies of 1000, 1100, 1200 c.p.s., etc., respectively, starting with the innermost ring of disc 94.

The innermost photoconductive ring 92, on plate 91 is connected, as described above to a tuned storage circuit $112_1$ tuned to a frequency $f_1$ of 1000 c.p.s. In a similar manner the adjacent cell $92_2$ is connected to a tuned circuit $112_2$, tuned to a frequency $f_2$ of 1100 c.p.s., for the example given. The outermost ring $92_{10}$ is connected to a similar circuit $112_{10}$ tuned to a frequency $f_{10}$ equal to 1900 c.p.s. The intermediate rings are similarly connected, but are not shown and the tuned circuits to which they are connected are merely indicated in the figure.

As disclosed above, for FIG. 1, each of the ten tuned circuits connected to the photoconductive rings are inductively coupled to secondary coils $132_1$, $132_2$, ... $132_{10}$, respectively, which are connected in series to each other and to the input of a broadband amplifier 138. The broadband amplifier 138 may be of any appropriate design and of sufficient bandwidth to pass all relevant frequencies for the ten channels spaced by 100 c.p.s.

Figure 5:
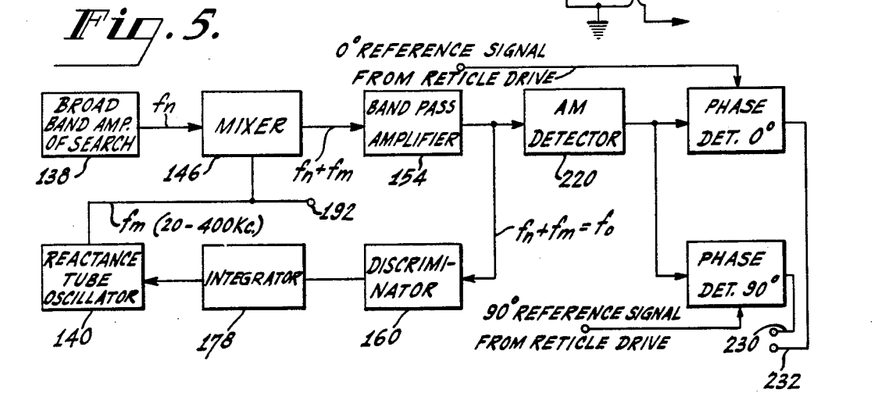
FIG. 5 is a block diagram of the electrical circuit of the tracking and search system of FIGURES 3–4.
Figure 6:
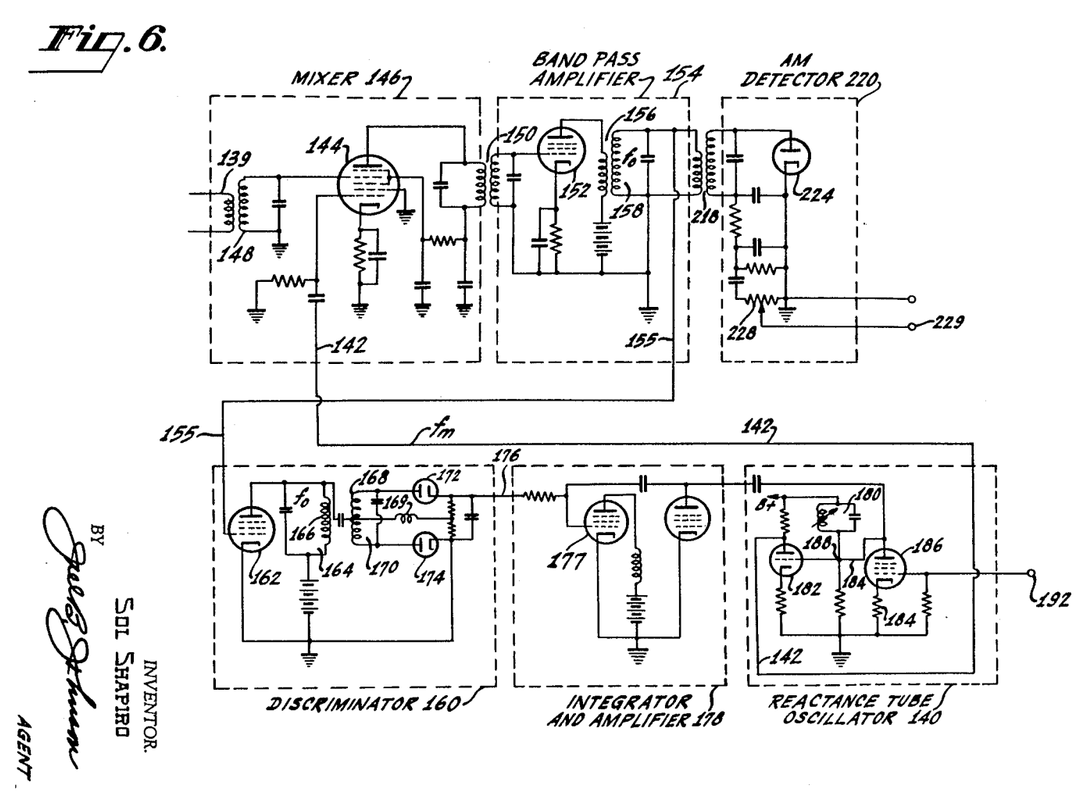
FIG. 6 is an electrical circuit diagram of the tracking portion of the system of FIGURES 3 and 5.

FIG. 5 represents, as a block diagram, a detector system for utilizing the information provided at the output 139 of amplifier 138 for detecting elevation and azimuth positions of the object projected onto the infra-red detector. FIG. 6 discloses circuitry, which may be used in the various portions of the system disclosed in FIG. 5.

The detector system of FIGURES 5 and 6 uses a reactance tube oscillator circuit 140 to provide a signal voltage $f_m$, which is used as a reference and is fed by conductor 142 (FIGURE 6) to the control grid of mixer tube 144 of the mixer circuit 146. Signal voltage $f_m$ may be selected having a frequency between 20 kc. and 400 kc. The signal from output portion 139 of the broadband amplifier 138 is shown as being inductively coupled by transformer 148 to a second control grid of the mixer tube 144. The output of the mixer circuit 146 is in turn inductively coupled by transformer 150 to the control grid of an amplifier tube 152 of a bandpass amplifier circuit 154. The output of tube 152 is inductively coupled by transformer 156 to a tuned circuit 158, which is tuned to a small band of frequencies on both sides of the resonant frequency $f_0$ of a discriminator circuit 160.

The output of the amplifier 154 is also fed by lead 155 to the discriminator circuit 160, which consists of an amplifier tube 162 having an output circuit 164 tuned to the discriminator resonant frequency $f_0$. The inductance of the tuned circuit 164 consists of a primary coil 166 coupled to a secondary coil 168, which is part of a circuit 170 also tuned to the frequency $f_0$. The mid-point of secondary coil 168 is tied through choke coil 169 to the cathodes of two diode rectifier tubes 172 and 174, whose anodes are respectively connected to opposite ends of secondary coil 168.

The two voltages, respectively of the two halves of the secondary coil 168, are separately rectified by the diodes 172 and 174. The diodes 172 and 174 are arranged so that the output of the discriminator at 176 is the arithmetic difference between these rectified voltages. As long as the frequency fed into tube 162 is equal to the resonant frequency $f_0$, the output of the discriminator at 176 is zero. However, deviations in the instantaneous frequency, fed to the discriminator away from the resonant frequency, will cause the rectified output of the discriminator at 176 to vary, producing a positive voltage when the input voltage is above resonance and a negative voltage when it is below resonance.

The output from discriminator 160 is fed directly to the control grid of an amplifier tube 177 of an integrating circuit 178, the output of which is fed to the reactance tube oscillator circuit 140. The integrating circuit 178 changes the signal from the discriminator circuit by changing the signal to one which is linearly proportional to that received from the discriminator circuit. This is a usable signal which is acceptable to the oscillator circuit 140.

The tank circuit 180 of the oscillator tube 182 is in series with the plate-cathode circuit 184 of a pentode tube 186, which draws a reactance current in accordance with the single modulating voltage fed to terminal 188 from the integrator circuit 178. This reactance current through tube 186 has an effect equivalent to placing a reactance across the oscillator tank circuit 180 of tube 182. The modulating voltage then at 188 controls the frequency of the signal generated in the oscillating circuit of tube 182.

In operation, then, with no signal being fed into the mixer 146 from the broadband amplifier 138, the output $f_m$ of the reactance tube oscillator circuit 140 is adjusted to equal the resonant frequency $f_0$ of the discriminator circuit 160. Subsequently, a signal $f_n$ fed into the mixer circuit 146 from amplifier 138 will provide an output signal to the bandpass amplifier 154 equal to the sum frequency, or $f_m + f_n$. Signal $f_n$ is any one of the frequencies $f_1, f_2, \ldots f_{10}$. The amplified signal of this frequency fed to the discriminator 160 changes the output of the discriminator to a positive voltage, which is modified by the integrator and fed to the circuit of reactance tube 186 to change the reactance of the oscillating circuit of tube 182 in a direction such that the output of the oscillating circuit 140 is a new signal $f_m$, which when added in the mixer circuit 146 to the incoming signal $f_n$, changes the sum of the mixed signals to a value equal to $f_0$.

The above described circuitry, thus automatically provides an output signal from the oscillator circuit 140, which when added to any of the signals fed from the amplifier 138 into the mixer 146 will always provide an output signal from the mixer equal to $f_0$. That is, a signal provided by the innermost infra-red sensitive band 92, and equal to a frequency of $f_1$ will initiate a corresponding signal output from the oscillator circuit 140 having a frequency of $f_{m1}$ so that $f_1 + f_{m1}$ will equal $f_0$. In a similar manner, the other frequencies generated by the infra-red device 90 will initiate corresponding frequencies from the oscillator circuit 140 such that $f_2 + f_{m2}$ equals $f_0$; $f_3 + f_{m3}$ equals $f_0$; etc. These frequencies $f_{m1}, f_{m2}, f_{m3}$, etc., of the oscillator circuit 140 will appear at terminal 192 where they may be calibrated in any appropriate manner to determine the cell ring 92, on which the image of the detected signal falls. This signal can be used to determine the elevation or depression of the target above the plane formed by the reference lines 118 and 120. If the target image moves from one cell ring 92 to another, the bandpass amplifier 154 will still pass it, resulting in an error signal from the discriminator 160. If relatively small area cells 92 are used, these signals are adequate for tracking the elevational position of a target.

The output $f_n + f_m$ of the bandpass amplifier 154 (FIG. 6) is fed by an inductive coupling transformer 218 to an A.M. detector circuit 220, which includes a diode tube 224.

Figure 8:
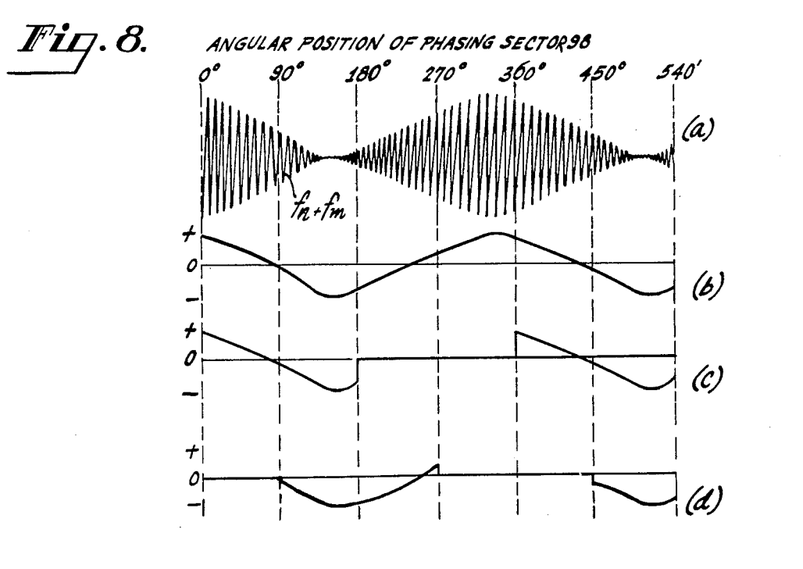
FIG. 8 shows graphically the wave formations obtained at different points in the tracking system of FIGURES 3–5.

The signal fed at 218 to the detector circuit is schematically represented at (a) in FIG. 8, where the $f_n$ component of the signal is that provided by a detector cell 92 in response to the light image of a target projected for example at a point 226 on the reticle 94 (FIG. 3). This point 226 is on a line 126 through the cell support plate 91, which makes an angle of 75° with the 0° reference line 120. The $f_n$ signal initiated by this projected image is chopped off by the phasing sector 98 of the reticle at the 75° position of the leading edge of sector 98. The signal $f_n$ reappears at the 255° position of the leading edge of the phasing sector 98, at which point all of the phasing sector 98 has passed across the point 226. The filtering action of the amplifier tuned to the fundamental of the mixed signal provides substantially a sine wave envelope for the $f_n + f_m$ signal. Thus instead of a square wave envelope of energy decreasing to zero between the 75° and 255° points, the energy envelope is spread out as indicated at (a) in FIG. 8. The signal $f_n + f_m$ is A.M. detected by circuit 220 to provide an output voltage across resistor 228 of the detector circuit having a simple sine wave configuration shown at (b) in FIG. 8. The phasing sector 98 of the chopping disc 94 will provide a similar chopping effect on the signal $f_n$ from any one of the cells 92. The signal $f_n$ will come through for 180° and then be cut off for the next 180° of each revolution of the phasing disc 94.

Figure 7:
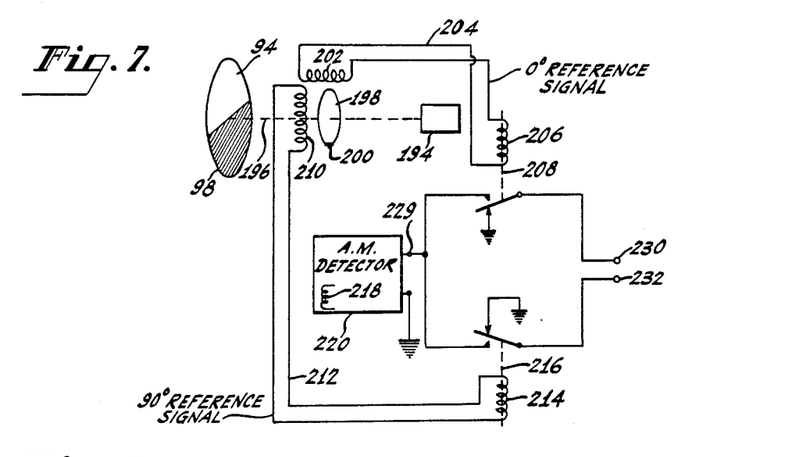
FIG. 7 is a schematic showing of the phase detecting system used in the system of FIGURES 3 to 5.

As indicated in FIG. 7, the phasing disc 94 is rotated by a motor 194. Fixed to the shaft 196 of the motor is a disc 198, to the periphery of which is fixed a small magnet 200. Closely spaced from the periphery of disc 198 are a pair of coils 202 and 210 mounted at 90° angular displacement in the plane of disc 198, and with one coil 202 connected by a circuit 204 to the coil 206 of a relay 208. In a similar manner the second coil 210 is connected in a circuit 212 to the coil 214 of a relay 216. The position of coil 202 is such that a sinewave current pulse is generated therein by the passage of the magnet 200, the pulse being initiated when the reticle disc 94 is at a position such that the leading edge of phasing sector 98 is coincident with the 0° reference line 120 (FIGURE 3). Coil 210 is positioned 90° from coil 202, such that a sine wave current pulse is generated therein by the passage of magnet 200 the pulse being initiated when the chopping disc 94 is at a position such that the leading edge of phasing sector 98 is coincident with the 90° reference line 122.

The relays 208 and 216 (FIGURE 7) operate to connect the output of the A.M. detector 220 to terminals 230 and 232, respectively. The operation of the two relays 208 and 216 is such as to connect the output terminal 229 of circuit 220 to the respective terminals 230 and 232 for 180° of the revolution of the phasing disc 94. Thus FIGURE 8c schematically illustrates the wave shape of the signal of FIGURE 8b, which is applied to terminal 230 by the gating action of relay 208. This signal of FIGURE 8c is proportional to the cosine of the phase angle with respect to the 0° position 120 of the phasing sector 98. FIGURE 8d schematically represents the signal appearing at terminal 232. Due to the closing of the switch of relay 216 at the 90° position of the phasing disc 94, this signal of FIGURE 8d, appearing at terminal 232, is proportional to the sine of the phase angle. Thus, the detected signals appearing at terminals 230 and 232 can be utilized in any desired manner to determine the angular displacement of the target image from the 0° reference line 120. This permits tracking a moving target.

The above described system is that in which unmodulated signals are optically modulated at a fixed rate by an optical chopper. This modulation of the infra-red energy is then used to fix the position in azmuth and in elevation of the target. The invention of FIGURES 3–8 is one which changes tracking by physical movement to one represented by the frequency and phase of the signal.

Individual filter channels are connected to each infra-red cell to limit the output of each cell to a specific frequency supplied by the chopping reticle. A single broadband amplifier is used to amplify the signal from all of the cells rather than using a separate amplifier for each infra-red cell. The advantage of dividing the infra-red detecting surface into individual cells or a cellular structure is the elimination of the noise from all of the infra-red sensitive areas except that one providing the receiving frequency $f_n$. The signal-to-noise ratio of any incoming signal is lessened because of this arrangement. Furthermore, the signal-to-noise ratio is also improved by the arrangement in which noise having the frequency of any one of the individual filter circuits and yet occurring in other infra-red sensitive cells will not be received to diminish the signal.

The use of a chopping reticle enables the separation of signal response due to background radiation, such as clouds, sky, etc., from a target response. With no target in the field of view, the background radiation provides a constant low level signal output from each photosensitive cell. Since the opaque chopping areas of the reticle are smaller than the width of a cell, there will be constant background radiation falling on each cell which will not be modulated by the chopping portions of the reticle. The source of a target signal may be considered as from an infinitely distant point and having a much greater intensity than the background signal. Thus, there will be superimposed on the output of a cell detecting the target a greater intensity signal having a frequency modulation in harmonic bands centering around the frequency $f_n$. The other harmonics are suppressed by the tuned filter circuits $34_1$, $34_2$, etc., and $112_1$, $112_2$, etc. If the reticle is divided into smaller and smaller chopping areas, such discontinuities of background radiation as cloud edges will not develop signals since they are not discontinuities within the dimensions of the chopping areas. The size of the chopping areas are thus limited by the expected size of the target image.

I claim:

1. An infra-red detecting system comprising an infra-red sensitive device including a plurality of photosensitive cells, means for directing infra-red radiation onto each one of said cells, means for chopping at different predetermined frequencies infra-red radiations directed onto said cells, an electric circuit means connected to said cells for providing amplified electrical signals having said different predetermined frequencies, said circuit means including a plurality of tuned circuit portions, a different one of said tuned circuit portions connected to each one of said cells to provide high impedance for only the electrical signals of predetermined frequency generated by said each one of said cells.

2. An infrared detecting system comprising an infrared sensitive device including a plurality of photosensitive cells, means for directing infrared radiation onto each one of said cells, means for chopping at different predetermined frequencies infrared radiations directed onto said cells, an electric circuit means including an amplifier circuit connected to said cells for providing amplified electrical signals having said different predetermined frequencies, said circuit means including a plurality of tuned circuit portions, a different one of said tuned circuit portions connected to each one of said cells to provide high impedance for only the electrical signals of predetermined frequency generated by said each one of said cells, said plurality of tuned circuit portions each including means coupling said tuned circuit portions to said amplifier circuit.

3. An infrared detecting system comprising an infrared sensitive device including a plurality of photosensitive cells, means for directing infrared radiation on each one of said cells, means for chopping at different predetermined frequencies infrared radiation directed onto said cells, an electric circuit means including a broadband amplifier circuit connected to said cells for providing amplified electrical signals having said different predetermined frequency, said electric circuit means including a plurality of tuned circuit portions, a different one of said tuned circuit portions connected to each one of said cells to provide high impedance for only the electrical signals of predetermined frequency generated by said each one of said cells, said plurality of tuned circuit portions each including means coupling said tuned circuit portions to said broadband amplifier circuit, and a plurality of detector circuits connected to the output of said broadband amplifier circuit, each one of said detector circuits including an input portion tuned to a different one of said predetermined frequencies.

4. An infrared detecting system comprising an infrared sensitive device including a plurality of photosensitive cells, means for directing infrared radiation onto each one of said cells, means for chopping at different predetermined frequencies infrared radiation directed onto said cells, an electric circuit means including a broadband amplifier circuit connected to said cells for providing amplified electrical signals having said different predetermined frequencies, said electric circuit means including a plurality of tuned circuit portions, a different one of said tuned circuit portions connected to each one of said cells to provide high impedance only for the electrical signal of predetermined frequency generated by said each one of said cells, said plurality of tuned circuit portions each including means coupling said tuned circuit portions to said broadband amplifier circuit, a plurality of detector circuits connected to the output of said broadband amplifier circuit, each one of said detector circuits including an input portion tuned to a different one of said predetermined frequencies, and a commutator device connected to the output of said detector circuits for sampling sequentially the voltage output from said detector circuits.

5. An infrared detecting system for detecting a distant target comprising an infrared sensitive device including a plurality of photosensitive cells each cell being associated with a different target location, means for directing infrared radiation onto each one of said cells, means for chopping at different predetermined frequencies infrared radiation directed onto said cells, an electric circuit means connected to said cells for providing amplified electrical signals having said different predetermined frequencies, means connected to said circuit means for selectively indicating said signals of different frequencies, said chopping means including a reticle plate mounted in the path of the infrared radiation directed onto said cells, said reticle plate having a plurality of portions opaque to infrared radiation and a plurality of other portions transparent to infrared radiation, and means for moving said reticle plate to alternately bring a number of said opaque and transparent reticle plate portions across the path of infrared radiation to each cell and at different frequencies for different cells.

6. An infrared detecting system for detecting a distant target comprising an infrared sensitive device including a plurality of photosensitive cells each cell being associated with a different target location, means for directing infrared radiation onto each one of said cells, means for chopping at different predetermined frequencies infrared radiation directed onto said cells, an electric circuit means connected to said cells for providing amplified electrical signals having said different predetermined frequencies, means connected to said circuit means for selectively indicating said signals of different frequencies, said chopping means including a disc mounted in the path of infrared radiation directed onto said cells, said disc having a plurality of portions opaque to infrared radiation and a plurality of other portions transparent to infrared radiation, said opaque and transparent disc portions being alternately arranged in contiguous strips, the number of said disc portions being progressively greater in successive ones of said strips, and means for rotating said disc to alternately bring said opaque and transparent disc portions across the path of infrared radiation to each cell.

7. An infrared detecting system for detecting a distant target comprising an infrared sensitive device including a plurality of photosensitive cells each cell being associated with a different target location, means for directing infrared radiation onto each one of said cells, means for chopping at different predetermined frequencies infrared radiation directed onto said cells, an electric circuit means connected to said cells for providing amplified electrical signals having said different predetermined frequencies, a plurality of tuned channels connected to said circuit means for selectively receiving the signals of each frequency in one channel, said chopping means including a disc mounted in the path of infrared radiation directed onto said cells, said disc having a plurality of portions opaque to infrared radiation and a plurality of other portions transparent to infrared radiation, said opaque and transparent disc portions being alternately arranged in contiguous concentric rings about the center of said disc the number of opaque and transparent portions in each ring increasing with increase in disc radius, and means for rotating said disc to bring a number of said opaque and transparent disc portions across the path of infrared radiation to each one of said cells.

8. An infrared detecting system for detecting a distant target comprising an infrared sensitive device including a plurality of photosensitive cells each cell being associated with a different target location, means for directing infrared radiation onto each one of said cells, means for chopping at different predetermined frequencies infrared radiation directed onto said cells, an electric circuit means connected to said cells for providing amplified electrical signals having said different predetermined frequencies, said chopping means including a disc mounted in the path of said infrared radiation directed onto said cells, said disc having a plurality of portions opaque to infrared radiation and a plurality of other portions transparent to infrared radiation, said opaque and transparent disc portions being alternately arranged in contiguous concentric strips, means for rotating said disc at a constant speed to move a different one of said concentric strips across the path of infrared radiation to each one of said cells, each of said concentric strips having a different predetermined number of said alternately arranged opaque and transparent disc portions to provide a different light chopping frequency for each one of said cells when said disc is rotated at a constant speed.

9. An infrared detecting system for detecting a distant target comprising an infrared sensitive device including a plurality of photosensitive cells each cell being associated with a different target location, means for directing infrared radiation onto each one of said cells, means for chopping at different predetermined frequencies infrared radiation directed onto said cells, an electric circuit means connected to said cells for providing amplified electrical signals having said different predetermined frequencies, said chopping means including a disc mounted for rotation about an axis and in the path of said infrared radiation directed onto said cells, said disc having a plurality of portions opaque to infrared radiation and a plurality of other portions transparent to infrared radiation, said opaque and transparent disc portions being alternately arranged in contiguous concentric rings, said photosensitive cells being arranged adjacent to said disc and extending radially from said axis of disc rotation, means for rotating said disc at a constant speed to move a different one of said concentric rings across the path of infrared radiation to each one of said cells, each of said concentric rings having a different predetermined number of said alternately arranged opaque and transparent disc portions to provide a different light chopping frequency for each one of said cells when said disc is rotated at a constant speed.

10. An infrared detecting system for detecting a distant target comprising an infrared sensitive device including a plurality of photosensitive cells each cell being associated with a different target location, means for directing infrared radiation onto each one of said cells, means for chopping at different predetermined frequencies infrared radiation directed onto said cells, an electric circuit means connected to said cells for providing amplified electrical signals having said different predetermined frequencies, said chopping means including a disc mounted for rotation about an axis and in the path of said infrared radiation directed onto said cells, said disc having a plurality of portions opaque to infrared radiation and a plurality of other portions transparent to infrared radiation, said opaque and transparent disc portions being alternately arranged in contiguous concentric rings, said photosensitive cells being arranged adjacent to said disc and extending singly in line radially from said axis of disc rotation, means for rotating said disc at a constant speed to move a different one of said concentric rings across the path of infrared radiation to each one of said cells, each of said concentric rings having a different predetermined number of said alternately arranged opaque and transparent disc portions increasing with disc radius to provide a different light chopping frequency for each one of said cells when said disc is rotated at a constant speed.

11. An infrared detecting system for detecting a distant target comprising an infrared sensitive device including a plurality of annular concentrically disposed photosensitive cells each cell being associated with a different target location, means for directing infrared radiation onto each one of said cells, means for chopping at different predetermined frequencies infrared radiation directed onto said cells, an electric circuit means connected to said cells for providing amplified electrical signals having said different predetermined frequencies, said chopping means including a disc mounted for rotation about an axis and in the path of said infrared radiation directed onto said cells, said disc having a plurality of portions opaque to infrared radiation and a plurality of other portions transparent to infrared radiation, said opaque and transparent disc portions being alternately arranged in contiguous concentric rings, said photosensitive cells arranged adjacent to said disc and extending radially from said axis of disc rotation in a plane parallel to said disc, means for rotating said disc at a constant speed to move a different one of said concentric rings across the path of infrared radiation to each one of said cells, each of said concentric rings having a different predetermined number of said alternately arranged opaque and transparent disc portions to provide a different light chopping frequency for each one of said cells when said disc is rotated at a constant speed.

12. An infrared detecting system for detecting a distant target comprising an infrared sensitive device including a plurality of annular concentrically disposed photosensitive cells each cell being associated with a different target location, means for directing infrared radiation onto each one of said cells, means for chopping at different predetermined frequencies infrared radiation directed onto said cells, an electric circuit means connected to said cells for providing amplified electrical signals having said different predetermined frequencies, said chopping means including a disc mounted for rotation about an axis and in the path of said infrared radiation directed onto said cells, said disc having a plurality of portions opaque to infrared radiation and a plurality of other portions transparent to infrared radiation, said opaque and transparent disc portions being alternately arranged in contiguous concentric rings, said photosensitive cells arranged adjacent to said disc and extending radially from said axis of disc rotation in a plane parallel to said disc, means for rotating said disc to move a different one of said concentric rings across the path of infrared radiation to each one of said cells, each of said concentric rings having a different predetermined number of said alternately arranged opaque and transparent disc portions to provide a different light chopping frequency for each one of said cells when said disc is rotated at a constant speed, said disc having a sector opaque to said infrared radiation to provide phasing of said electrical signals of said electric circuit means.

13. An infrared detecting system comprising an infrared sensitive device including a plurality of photosensitive cells, means for directing infrared radiation onto each one of said cells, means for chopping at different predetermined frequencies infrared radiation directed onto said cells, an electric circuit means connected to said cells for providing amplified electrical signals having said different predetermined frequencies, said chopping means including a disc mounted in the path of said infrared radiation directed onto said cells, said disc having a plurality of portions opaque to infrared radiation and a plurality of other portions transparent to infrared radiation, said opaque and transparent disc portions being alternately arranged in concentric strips, means for rotating said disc to move a different one of said concentric strips across the path of infrared radiation to each cell, each of said concentric strips having a different predetermined number of said alternately arranged opaque and transparent disc portions to provide a different light chopping frequency for each one of said cells when said disc is rotated at a constant speed, said disc also having a sector opaque to said infrared radiation to provide phasing of said electrical signals of said electric circuit means.

14. An infrared system for detecting a distant target, said system comprising, an infrared sensitive device including a plurality of photosensitive cells, means for directing infrared radiation onto said cells, means for chopping at different predetermined frequencies said infrared radiation directed on each cell, a first electric circuit means connected to said cells for providing amplified electrical signals initiated by said chopped radiation from said cells and having said different predetermined frequencies, said chopping means including structure to periodically cut off said radiation to said cells at determinable times to provide phasing of said electrical signals, means for providing a reference signal, and a second electrical circuit connected to said last means and said first circuit means for comparing said reference signal with said phased signals to determine a first coordinate of said target, and means for separating said electrical signals from said cells to determine a second coordinate of said target.

15. An infrared system for detecting a distant target, said system comprising an infrared sensitive device including a plurality of photosensitive cells, means for directing infrared radiation onto said cells, means for chopping at a different predetermined frequencies said infrared radiation directed on each cell, a first electric circuit means connected to said cells for providing a different electrical signal initiated by said chopped radiation from each one of said cells and having one of said different predetermined frequencies, said chopping means including structure to periodically cut off said radiation to said each cell at determinable times to provide phasing of said electrical signals therefrom, means for providing a reference signal, and a second electrical circuit connected to said last means and said first circuit means for comparing said reference signal with said phased signal to determine a first coordinate of said target, and means for discriminating between said electrical signals from said cells to determine a second coordinate of said target, said last means including a circuit system connected to said first circuit means to provide a variable signal and comprising means for adding said variable signal to said electrical signals from said cells to obtain a predetermined fixed signal.

16. An infrared system for detecting a distant target, said system comprising, an infrared sensitive device including a plurality of photosensitive cells, means for directing infrared radiation onto said cells, means for chopping at different predetermined frequencies said infrared radiation directed on each cell, a first electric circuit means connected to said cells for providing a different electrical signal initiated by said chopped radiation from each one of said cells and having one of said different predetermined frequencies, said chopping means including structure to periodically cut off said radiation to said each cell at determinable times to provide phasing of said electrical signals therefrom, means for providing a reference signal, and a second electrical circuit connected to said last means and said first circuit means for comparing said reference signal with said phased signal to determine a first coordinate of said target, and means for identifying said electrical signal from each cell to determine a second coordinate of said target, said last means including an oscillator circuit for providing a modulating signal, a mixer circuit connected to first circuit means and said oscillator circuit to provide an output signal frequency equal to the sum of said electrical signal from said each cell and said modulating signal a bandpass amplifier for separating the desired signal from others and a discriminator circuit connected between the output of said mixer circuit and said oscillator circuit to change said modulating signal in accordance with the frequency of said electrical signal from said each cell.

17. An infra-red detecting system comprising an infra-red sensitive device including a plurality of photosensitive cells, means for directing infra-red radiation onto each one of said cells, means for chopping at different predetermined frequencies infra-red radiations directed onto said cells, an electric circuit means connected to said cells for providing amplified electrical signals having said different predetermined frequencies, said circuit means including a plurality of frequency selective means, a different one of said frequency selective means being connected to each one of said cells to select only the electrical signals of predetermined frequency generated by said each one of said cells.

References Cited in the file of this patent

UNITED STATES PATENTS

| | | |
|---|---|---|
| 2,403,066 | Evans | July 2, 1946 |
| 2,403,983 | Koenig | July 16, 1946 |
| 2,423,885 | Hammond | July 15, 1947 |
| 2,436,178 | Rajchman | Feb. 17, 1948 |
| 2,561,869 | Kent | July 24, 1951 |
| 2,659,828 | Elliott | Nov. 17, 1953 |
| 2,856,531 | Brouwer | Oct. 14, 1958 |
| 2,873,381 | Lauoresch | Feb. 10, 1959 |
| 2,903,204 | Nyman et al. | Sept. 8, 1959 |